United States Patent [19]

Neuner et al.

[11] Patent Number: 4,714,926

[45] Date of Patent: Dec. 22, 1987

[54] ROD POSITION INDICATION SYSTEM WITH TEMPERATURE COMPENSATION

[75] Inventors: James A. Neuner, Richland Township, Lebanon County; Dirk J. Boomgaard, Monroeville, both of Pa.

[73] Assignee: Westinghouse Electric Corp., Pittsburgh, Pa.

[21] Appl. No.: 922,792

[22] Filed: Oct. 23, 1986

Related U.S. Application Data

[63] Continuation of Ser. No. 606,422, May 2, 1984, abandoned.

[51] Int. Cl.[4] ............................................. G01C 19/08
[52] U.S. Cl. .................................. 340/870.36; 336/55; 376/258
[58] Field of Search .................. 340/870.17, 870.36, 340/501, 686; 376/258; 374/6, 55; 336/55, 30; 33/125 T

[56] References Cited

U.S. PATENT DOCUMENTS 2,772,383 11/1956 Bradley et al. .................. 336/55 X
2,917,445 12/1959 Oakes et al. ..................... 340/686 X
3,441,834 4/1969 Moskowitz et al. ........ 340/870.17 X

FOREIGN PATENT DOCUMENTS 834783   5/1960  United Kingdom .
958004   5/1964  United Kingdom .
1106730  3/1968  United Kingdom .
1426211  2/1976  United Kingdom .
1512289  6/1978  United Kingdom .
1556200  11/1979 United Kingdom .

Primary Examiner—Jerry W. Myracle
Attorney, Agent, or Firm—Daniel C. Abeles

[57] ABSTRACT

A position indication system for detecting the position of an elongated, metallic member which is linearly movable between first and second positions along an axis corresponding to its longitudinal dimension. A sensor is operatively associated with the member for producing a first output signal which corresponds to the position of the member and which fluctuates with changes in the temperature of the member. A temperature monitoring device is operatively associated with the member for monitoring its temperature and for producing a second output signal which varies in direct response to changes in the temperature of the member. A combining circuit is connected to the sensor and to the temperature monitoring device for receiving the first and second output signals and for producing a third output signal which represents the position of the member compensated for changes in temperature of the member.

10 Claims, 5 Drawing Figures

ROD POSITION INDICATION SYSTEM WITH TEMPERATURE COMPENSATION

This is a continuation of application Ser. No. 606,422, filed May 2, 1984 and now abandoned

BACKGROUND OF THE INVENTION

1. Field of the Invention

The invention relates to a position indication system for an elongated metallic member, such as a rod, which is movable in a direction along its longitudinal axis, and more specifically to a temperature compensated position indication system which determines the relative position of a control rod within the core of a nuclear reactor.

2. Description of the Prior Art

There are a great number of applications requiring remote monitoring of the position of an elongated movable metallic member having one degree of freedom along its longitudinal axis. For example, in the nuclear art it is necessary to raise and lower control rods within the reactor core for controlling the energy output of the nuclear reactor. The use of the term "control rod" is used herein to include any member positioned within the reactor which alters the reactivity of the reactor. Thus, this includes rods which serve other purposes besides normal control use. The use of the word "rod" is synonymous with "control rod" for the purposes of this invention.

The control rods are located within proximity of nuclear fuel elements comprising nuclear fissionable material. Generally, the greater the number of neutrons within the core of the reactor, the greater the number of fissions of the fuel atoms that take place, and consequently, the greater the amount of energy released. Energy, in the form of heat, is removed from the reactive region by a coolant which flows through the region and then flows to a heat exchanger wherein the heat from the reactor coolant is used to generate steam for driving turbines to transform heat energy into electrical energy. To decrease the energy output of the nuclear reactor, the control rods, made of materials which absorb neutrons, are inserted within the reactive region, commonly known as the nuclear core. The greater the number of control rods and the further the control rods are inserted within the reactive region, the greater the number of neutrons that will be absorbed and hence the energy output of the reactor will decrease. Conversely, to increase the energy output of the reactor, the nuclear control rods are withdrawn from the reactive region. Consequently, the number of neutrons absorbed decreases, the number of fissions increase, and the energy output of the reactor increases.

For pressurized water reactors, it is of the utmost importance to know the accurate position of each of the control rods. Differences of over 15 inches between neighboring rods adversely affect fuel management. In addition, knowledge of the position of the rods versus thermal power output gives an indication of the condition of the reactor, thus, the degree of fuel burnup. Therefore, extremely reliable control rod drive and position monitoring systems must be employed in order to maintain the safe and reliable operating status of the reactor.

One system presently employed to lower and raise the control rods utilizes a jack-type electromechanical mechanism which employs a plurality of electrical coils to incrementally insert or withdraw each control rod within the reactor. Such a system is more fully described in U.S. Pat. No. 3,158,766 issued to E. Frisch and assigned to the assignee of the present invention.

In a pressurized water reactor three mechanisms are generally available for providing an indication of rod position; a step counter, a movable in-core flux-mapping system and a rod position indication system.

The step counter provides an indirect measurement by electrically counting the number of mechanical steps commanded by the rod control system. As an indirect measurement system, it cannot detect mechanical malfunctions that prevent rod movement when commanded.

The movable in-core flux-mapping system does provide direct measurement of control rod position as it is moved in a thimble close to the rod of interest. However, it is used for this purpose only as a backup system because of the mechanical wear and operator interaction problems associated with its continual use. Therefore, the rod position indication system is the primary means of direct measurement of control rod position.

As previously described, the control rods move within a pressure vessel and are attached to drive rods, which can be incrementally moved in a forward or reverse direction by a drive mechanism, such as the magnetic jack mechanism described in the cited Frisch patent. The drive rod extends longitudinally through the pressure vessel, along the axis of movement of the control rod, into the sealed, pressurized environment of the rod travel housing. Since it is of the utmost importance to maintain the sealed integrity of the pressurized vessel, mechanical penetrations are kept at a minimum to reduce the likelihood of loss of the pressurized environment contained therein. Accordingly, no mechanical penetrations are permitted for detecting the relative position of the control rods within the core of the reactor. Inasmuch as it would be a very difficult task to detect the position of the actual control rods, it has been the practice to detect the position of the drive rods which are affixedly coupled thereto and translate drive rod position into control rod location within the core of the reactor vessel.

A number of detectors have been used in the past to determine drive rod position. In one such detector a permanent magnet is located on top of the drive rod for movement therewith inside the rod travel housing. A series of reed switches and associated precision resistors are disposed outside the rod travel housing along its entire length, the resistors being connected in electrical series with each other. Movement of the drive rod, and hence the magnet, activates the reed switches as the magnetic flux of the magnet comes within range of the respective switches. The activation of a reed switch shorts out the associated precision resistor. A measurement of the impedance of the series connected resistors thus provides an indication of the rod position. A drawback of this detector is that a significant amount of magnetic flux is generated by the mechanism that lifts the rod which totally disrupts the reed switches, giving rise to an erroneous reading of position indication. Also, the field of action of the magnetic flux of the magnet is not particularly well contained which could inadvertently actuate several adjacent switches simultaneously which again leads to an erroneous reading.

In another known detector a permanent magnet is employed at the top of the drive rod as discussed above, however the reed switches and precision resistors are replaced with a conductive wire that is tightly strung along the side of the travel housing. A large current pulse is passed through the wire which causes the wire to twist under the action of a magnetomotive force at the zone at which the flux of the magnet passes through the wire. The twisting action propagates up the wire and induces a voltage pulse in a transducer located at the end of the wire. The time delay from the initiation of the current pulse in the wire to the occurrence of a voltage pulse by the transducer corresponds to the position of the magnet, and thus of the control rod. This detector has several disadvantages. Complicated mechanical means are required to damp the twisting action of the wire to prevent continuous oscillation thereof up and down the wire. In addition since the voltage pulse generated by the transducer is relatively small, it must be amplified by an immediate set of electronics which by necessity is located in a hostile environment of extremely high temperatures and radiation fields, leading to a high rate of failure of the detector electronics.

In a further known detector, a long single winding extends along the length of the rod travel housing and rod position is measured as a function of impedance changes in the winding as the position of drive rod changes within the rod travel housing. The impedance contributions of winding resistance, however, is not entirely predictable thus reducing the reliability of this type of detector.

An analog detector is known which avoids many of the above drawbacks. This detector includes a plurality of layered, wound coils concentrically arranged in a stack and supported by a nonmagnetic stainless steel tubular substructure that is slid over the nonmagnetic rod travel housing. The coils are arranged alternately as primary and secondary coils, with all the primary coils connected in series and all the secondary coils connected in series. The coils form, in effect, a long linear voltage transformer distributed over the height of the travel housing such that the coupling from primary to secondary is affected by the extent to which the magnetic drive rod penetrates the coil stack. Rod position is determined by applying a constant sinusoidal excitation current to the primary and measuring the voltage induced across the secondary. The magnitude of the induced secondary voltage corresponds to rod position.

The primary advantages that the transformer type of detector provides over the other detectors are: (1) there is no requirement for a permanent magnet on top of the drive rod and within the primary coolant; (2) there is no active circuitry required within the hostile environments of either the containment building or reactor head area; and (3) when the primary is excited by a precision current source and the secondary voltage is sensed with a high input impedance so that little current actually flows through the secondary, then the less predictable contributions of winding resistance and leakage inductance can be ignored. The transformer type of detector, however, has an accuracy problem in that the secondary voltage drifts with changes in the operating conditions of the reactor. A primary source of this drift has been traced to changes in the permeability and resistivity of the drive rod with variations in drive rod temperature. This problem requires frequent recalibration which is both tedious and time consuming, and often results in delayed operation of the reactor.

U.S. Pat. Nos. 3,846,771 and 3,893,090, each describe a detector employing digital techniques which is more accurate than any of the foregoing detectors and avoids many of the above drawbacks. The digital detector, however, is expensive, which is a particularly important factor when consideration is given to repairing or improving an existing detector vis-a-vis total replacement thereof. For example, in a situation where the transformer type detector has been installed, it would be preferable if a relatively inexpensive means could be devised to compensate for drift, rather than replacing the detector and related electronics with the more expensive digital detector and its related electronics. In this way, the above noted advantages of the transformer type of detector are preserved and the expense of complete replacement is saved.

SUMMARY OF THE INVENTION

It is an object of the present invention to improve the accuracy of a rod position indication system.

It is a further object of the invention to improve the accuracy of a rod position indication system by compensation for drift in the output of a rod position indicator due to temperature variations in the drive rod.

The above and other objects are accomplished by the invention in which a position indication system is provided for detecting the position of an elongated, metallic member which is linearly movable between first and second positions along an axis corresponding to its longitudinal dimension. The system includes a sensing means operatively associated with the member for producing a first output signal which corresponds to the position of the member and which fluctuates with changes in the temperature of the member. A temperature monitoring means is disposed in operative association with the member for monitoring its temperature and for producing a second output signal which varies in direct response to changes in the temperature of the member. Combining means are connected to the sensing means and the monitoring means for receiving the first and second output signals and for producing a third output signal which represents the position of the member compensated for changes in temperature of the member.

DESCRIPTION OF THE PREFERRED EMBODIMENT

Figure 1:
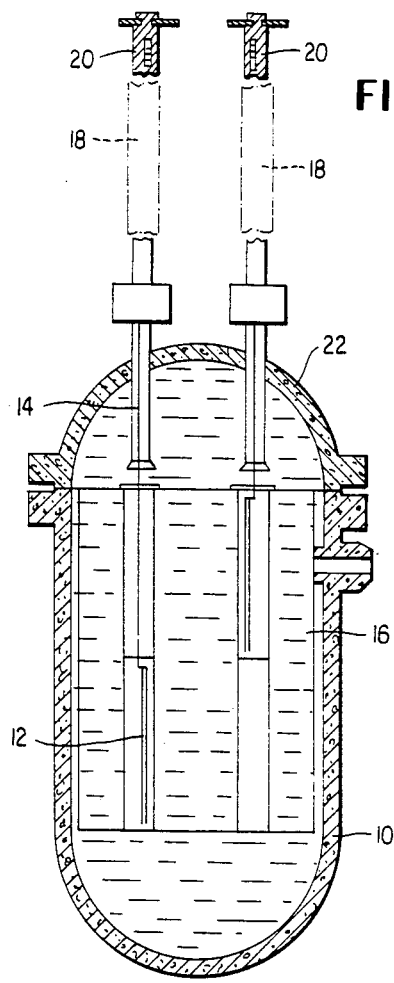
FIG. 1 is a schematic diagram of a nuclear reactor and its control rod drive in connection with which a position indication system according to the invention may be used.

Accurate knowledge of the position of the control rods in a nuclear reactor is essential for ensuring the safe and efficient operation of the reactor. As can be appreciated by referring to FIG. 1, the sensing of the position of the control rods within a pressurized water reactor is particularly difficult because of the necessity for maintaining the sealed integrity of the reactor pressure vessel 10. The control rods 12 and the drive rods 14, which are structurally coupled to their respective control rods 12, are surrounded with water 16 which completely fills the pressure vessel 10. Under normal operating conditions, the water is at a high temperature and is pressurized so that no boiling takes place.

The position of each control rod 12 is determined from measurements obtained from a sensing mechanism 18 placed outside the pressure vessel 10, because no mechanical penetrations of the pressure vessel 10 for purposes of control rod position sensing are permitted. The only area where the sensing mechanism 18 can be placed is along the rod travel housing 20. The drive rods 14 move within their respective rod travel housings 20, which are sealed pipes formed integral with and extending longitudinally upward from the head 22 of the reactor.

A sensing mechanism 18 placed along the rod travel housing 20 can only sense the position of the drive rod 14. However, it is normally assumed that the fastening of the control rod 12 to its respective drive rod 14 is reliable and therefore the displacement of the drive rod 14 and the control rod 12 are the same.

Figure 2:
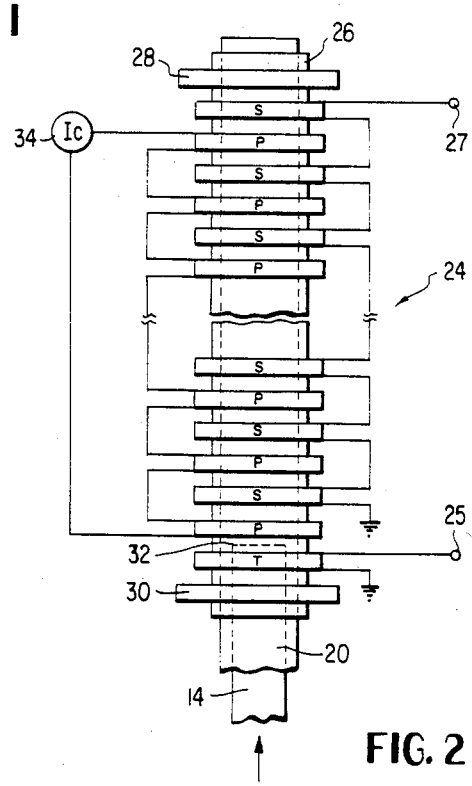
FIG. 2 is a schematic diagram of a rod position indicator constructed in accordance with the invention.

FIG. 2 illustrates a rod position indicator 24 of the linear voltage transformer type described above which has been modified to include a tertiary coil which produces an output voltage at terminal 25 used for temperature compensating the secondary output voltage at terminal 27 in accordance with the invention. Indicator 24 includes a plurality of annular, layer-wound primary coils P which are electrically connected in series to form a primary winding, a plurality of annular, layer-wound secondary coils S which are electrically connected in series to form a secondary winding, and an annular, layer-wound coil which forms a tertiary coil T. All of the coils are mounted on a coil form 26 having end plates 28 and 30 and being comprised of a thin nonmagnetic stainless steel tubular substructure that is slid over the nonmagnetic rod travel housing 20 which encloses the drive rod 14. The secondary coils S are alternately interleaved and inductively coupled with the primary coils P, with a secondary coil S located at the top of the primary and secondary coil stack and a primary coil located at the bottom of the stack. The tertiary coil is mounted on the coil form 26 adjacent the bottom primary coil to which it is inductively coupled.

In one illustrative configuration, the coil form 26 is approximately 393.7 cm long with a combined, primary and secondary active coil length of approximately 384.81 cm. The active coil includes 72 layer-wound coils, half of which are primary coils P with the other half being secondary coils S alternately interleaved as discussed above. Each coil is 13.72 cm in diameter and approximately 5.08 cm high. The primary coils P are essentially identical while the secondary coils S preferably have progressively more turns near the bottom of the detector. A space of approximately 7.62 cm exists between the lowest primary coil P and the bottom end plate 30 of the coil form 26. It is in this space that the tertiary coil T is located.

Coil form 26 is mounted on rod travel housing 20 so that at least the top portion 32 of drive rod 14 always penetrates the tertiary coil T. A sinusoidal current source 34 is connected for exciting a current in the primary winding which induces a voltage in both the secondary winding and tertiary coil.

Drive rod 14 is made of a metal having magnetic properties. As may be appreciated, as drive rod 14 moves up through its housing 20 the coupling between the primary and secondary windings increases which causes a proportional increase in the magnitude of the voltage induced in the secondary winding. The secondary voltage thus also corresponds to the position of the control rod as it is withdrawn from the core of the reactor.

Detector 24, without the tertiary coil, is essentially the prior art linear voltage transformer detector described earlier. While in theory the relationship between secondary voltage and rod position should be linear, in fact there are a number of variables which introduce error into the output of the secondary winding. For one thing, there is some coupling between primary and secondary windings even when there is minimum penetration of the coil stack by the drive rod. This residual coupling produces an offset voltage of approximately 9 volts. It has also been found that the configuration of the detector results in a nonlinear secondary voltage output which is overcome in part by the nonuniform distribution of secondary windings as noted above.

Through extensive evaluation it has been found that a major source of system error is introduced by variation in the temperature of the drive rod which is caused by changes in coolant temperature. The reason for this is that the permeability and resistivity of the drive rod are temperature dependent so that as the temperature of the drive rod changes, its permeability and resistivity also change which of course directly affects the coupling between the primary and secondary windings of the detector.

The travel of the control rod in a commercial reactor is measured in steps of 1.59 cm and normal rod travel is 228 steps. Coolant temperature can vary between a cold temperature of 32° C. at shutdown to an average temperature of 298° C. $\pm 7°$ C. under normal plant operating conditions.

Figure 3:
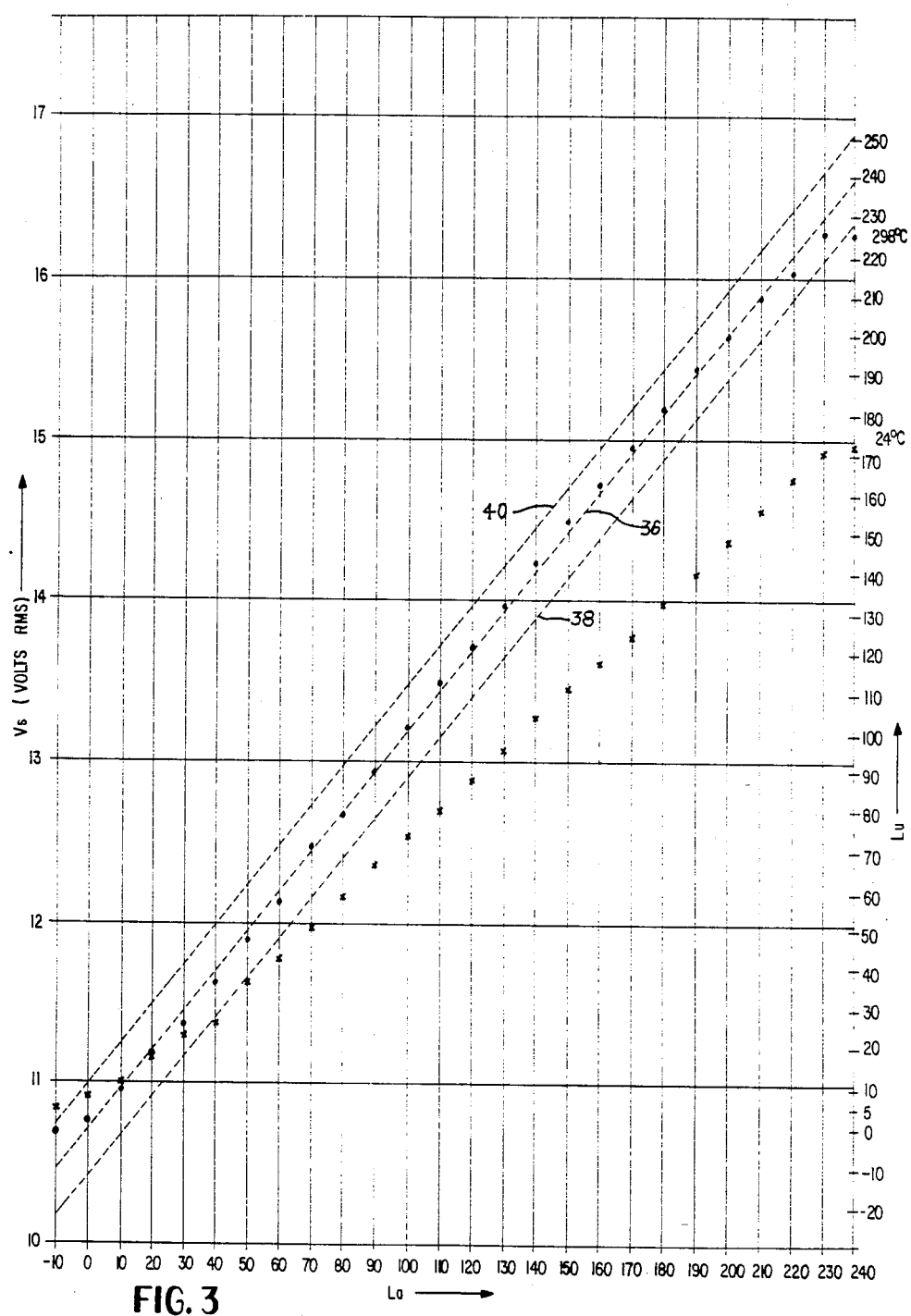
FIG. 3 is a graph illustrating the relationship between the secondary voltage output of a prior art position indicator versus actual rod position at two different temperatures.

FIG. 3 illustrates the secondary voltage response Vs of a detector of the type illustrated in FIG. 2 without temperature compensation at 298° C. and at room temperature (24° C.) with the actual position La of the rod being moved from 0 to 228 steps. The best linear fit of the data at 298° C. is illustrated by the center dotted line 36. The required accuracy of the rod position system is $\pm 5\%$, which corresponds to $\pm 11.5$ steps and this is indicated by the dotted lines 38 and 40 on either side of the best linear fit 36. Under these conditions, the error of the detector due to temperature sensitivity alone is between 20% and 40% of the allowed error budget depending on drive rod temperature at the time of calibration.

If, for example, the detector were calibrated at the normal hot operating temperature of 298° C., the performance at room temperature (24° C.) would exhibit errors of about 73 steps when the rod is at 228 steps. This is illustrated by the vertical axis on the right hand side of FIG. 3 which indicates the uncompensated rod position Lu in steps if the secondary voltage Vs of the detector were calibrated against actual rod position at 298° C.

Figure 4:
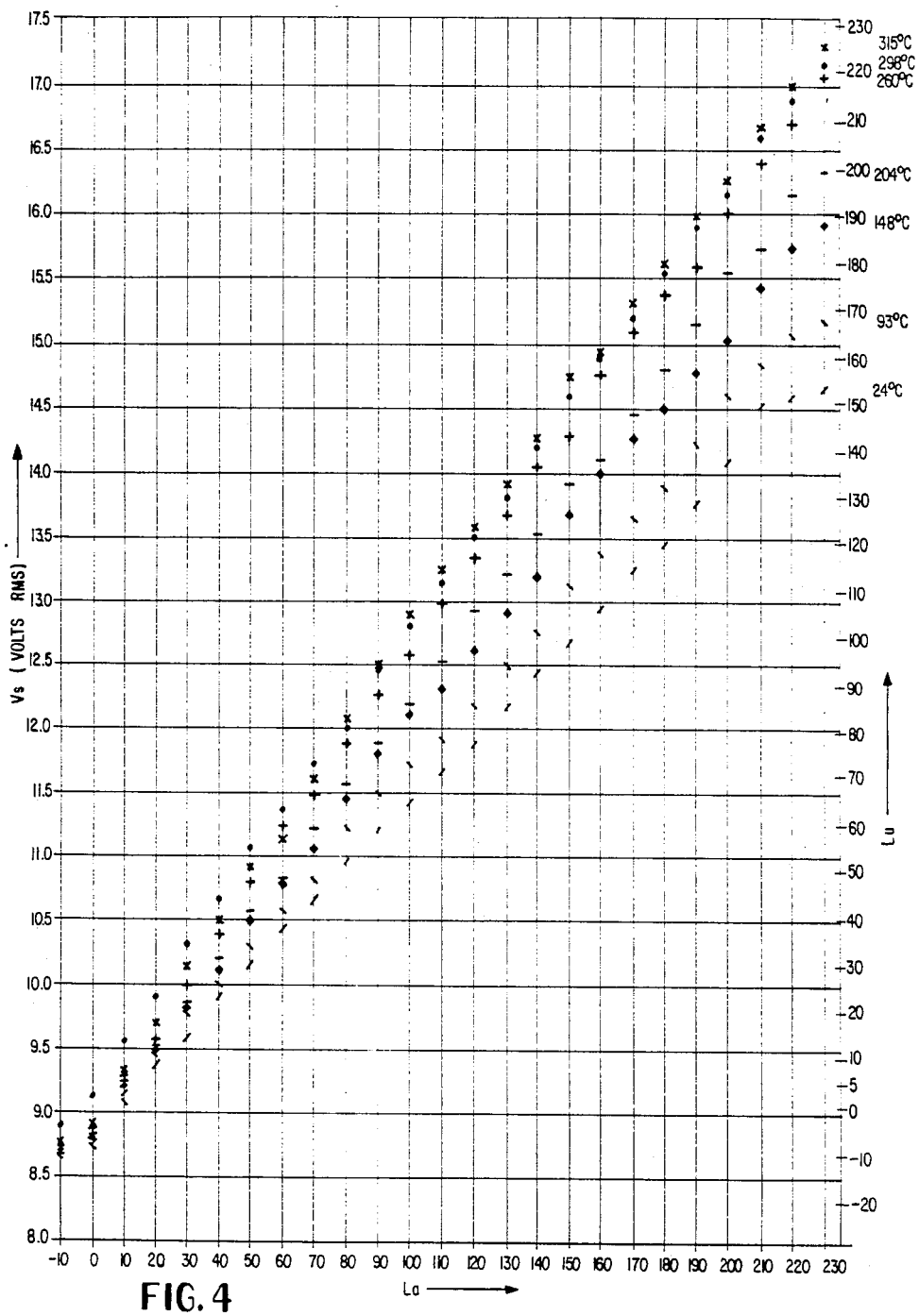
FIG. 4 shows a series of seven curves of secondary voltage output of a prior art position indicator versus actual rod position at seven respective temperatures.

FIG. 4 is similar to FIG. 3 but illustrates the secondary voltage Vs response of the detector versus actual rod position La without temperature compensation at seven different temperatures. The righthand vertical axis in FIG. 4 is calibrated to indicate the uncompensated rod position Lu if the secondary voltage Vs were calibrated for best fit at 315° C.

Thus, for example at 315° C. a secondary voltage Vs of 14.75 volts corresponds to an actual rod position La of 150 steps. However, at room temperature (24° C.) an actual rod position La of 150 steps corresponds to a secondary voltage Vs of approximately 12.6 volts. If the secondary voltage were calibrated to the actual rod position La at 315° C., then 12.6 volts on the secondary would indicate an uncompensated (and erroneous) rod position Lu of only slightly less than 100 steps.

Obviously, either the secondary voltage of the detector has to be recalibrated each time the temperature of the coolant (and hence of the drive rod) changes, or some form of compensation for the errors caused by temperature has to be made.

The temperature of interest is that of the drive rod since it is the permeability and resistivity of the drive rod which varies in accordance with temperature and causes the secondary voltage to drift with temperature. Until now, however, no direct measurement of the drive rod temperature was available. Indirect measurements are possible by using either detector coil temperature, which is determined by coil resistance or measuring the average coolant temperature. Of these, average coolant temperature is considered the most reliable measurement since it is not affected by other variables such as cooling air flow over the detector. Average coolant temperature could be used to correct 41.5% of the error in the slope (rate of increase) of the curves illustrated in FIGS. 3 and 4 and an additional 6 steps of offset to the indicated value as the temperature changes from 315° C. to 24° C. A method which could use average coolant temperature for temperature compensation of a rod position indication system is described in U.S. patent application Ser. No. 06,606,421, filed concurrently and assigned to the same assignee.

The use of average coolant temperature for temperature compensation does improve the accuracy of the detector. However, it also has some drawbacks. It requires a dependence of the otherwise independent rod position measurements on a few temperature signals provided from the process control system. Also, all rods are treated equally assuming that the relationship between their drive rod temperatures and the average coolant temperature is the same, which is not always the case. Response to transient thermal conditions caused by rapid rod movement or coolant temperature change will continue to cause some errors.

A measurement which is directly responsive to the temperature of the drive rod for purposes of temperature compensation of the secondary voltage of the detector would thus be preferred to the indirect temperature measurement obtained by measuring the average coolant temperature. This is accomplished in accordance with the present invention by the use of tertiary coil T as illustrated in FIG. 2.

With the tertiary coil T located so that it is always penetrated by the drive rod 14, the voltage induced on the tertiary coil T will change in the same manner as that induced on the secondary winding as a result of changes in the permeability and resistivity of the drive rod. The voltage induced across the tertiary coil T by the primary winding may then be used to compensate the voltage induced across the secondary winding for changes in temperature over the entire temperature range.

Figure 5:
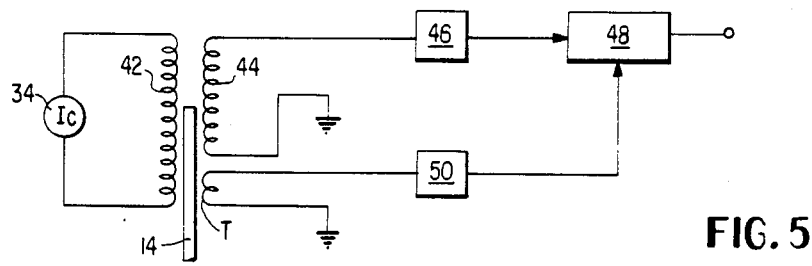
FIG. 5 is a circuit schematic in partial block diagram form showing one embodiment of an electronic circuit that could be used with the position indicator of FIG. 2 for temperature compensating the secondary voltage output in accordance with the invention.

A circuit for using the output of the tertiary coil to compensate the secondary voltage for variations in the temperature of the drive rod is illustrated in FIG. 5. The series connected primary coils P and series connected secondary coils S are illustrated in FIG. 5 as single primary and secondary windings 42 and 44, respectively. The primary winding 42 is connected to a stable sinusoidal current source 34, having for example a frequency of 60 Hz and a magnitude of 200 ma. The secondary winding 44 is connected via an analog to digital converter 46 to part of the address input of a temperature compensation PROM 48. The output of tertiary coil T is connected via an analog to digital converter 50 to another part of the address input of PROM 48.

PROM 48 stores binary words each of which represent the actual position of the control rod at a discrete magnitude of secondary voltage and a discrete temperature value. In essence, PROM 48 contains a lookup table of curves similar to those illustrated in FIG. 4 at incremental temperature values within the temperature range of the drive rod. The table of values stored in PROM 48 is obtained during a calibration process wherein the drive rod is stepped through all of its positions at each discrete value of temperature while measuring the secondary voltage at each such temperature and position. Once having obtained and stored the calibrated values in temperature compensation PROM 48, the true position of the drive rod is obtained during operation by accessing the memory location in PROM 48 which corresponds to the uncompensated voltage on secondary winding 44 and the temperature represented by the voltage on the tertiary coil T.

Alternatively, the temperature represented by the voltage on the tertiary coil may be used to derive a temperature compensated secondary voltage in accordance with the method disclosed in copending U.S. patent application Ser. No. 06/606,421, filed concurrently and assigned to the present assignee, the disclosure of which is incorporated herein by reference. With the method disclosed therein a first calibration curve would be formed which indicates the change in secondary offset voltage required at each value of drive rod temperature and a second calibration curve would be generated which indicates the required correction in the rate of increase of the secondary voltage as the rod is stepped through its positions at each value of rod temperature. The uncompensated secondary voltage of the detector may then be corrected by analog or digital techniques by multiplying the secondary voltage by the rate correction factor (also known as the gain correction factor) at the temperature indicated by the tertiary coil and adjusting that product with the change in offset required at the temperature represented by the output of the tertiary coil.

It will be understood that the above description of the present invention is susceptible to various modifications, changes and adaptations, and the same are intended to be comprehended within the meaning and range of equivalence of the appended claims.

We claim:

1. A position indication system for detecting the position of an elongated, magnetic member which is linearly movable between first and second positions along an axis corresponding to its longitudinal dimension, wherein the member has magnetic and electrical properties which vary as a function of the temperature of the member, comprising:

sensing means operatively associated with the member for producing a first output signal which corresponds to the position of the member and which fluctuates with changes in the temperature of the member;

temperature monitoring means including electrical coils inductively coupled together, with one of said coils being adjacent a zone in which at least a portion of the magnetic member is always present for producing a second output signal which varies in direct response to changes in the magnetic and electrical properties of the member; and calibrating means connected to said sensing means and said monitoring means for receiving the first and second output signals, said calibrating means containing predetermined calibrating information for producing a third output signal, in dependence of the first and second output signals, which represents the position of the member compensated for changes in temperature of the member.

2. A system according to claim 1, wherein said sensing means including a primary winding and a secondary winding each substantially extending between the first and second positions, with the first output signal consitituting a voltage induced across said secondary winding by a current in said primary winding, and said temperture monitoring means being constituted by said one coil inductively coupled with said primary winding, with the second output signal constituting a voltage induced across said one coil by the current in said primary winding.

3. A position indication system for detecting the position of an elongated magnetic member which is linearly movable between first and second positions along an axis corresponding to its longitudinal dimension, wherein the member has magnetic and electrical properties which vary as a function of the temperature of the member, comprising:

sensing means operatively associated with the member for producing a first output signal which corresponds to the position of the member and which fluctuates with changes in the temperature of the member, said sensing means including a primary winding and a secondary winding each substantially extending between said first and second positions and comprising a plurality of annular layer-wound coils connected in electrical series with said primary coils being alternately interleaved with said secondary coils to form a stack, said stack surrounding the magnetic member and being arranged with a primary coil at one end of said stack, the first output signal constituting a voltage induced across said secondary winding by a current in said primary winding; and temperature monitoring means including electrical coils inductively coupled together, with one of said coils being adjacent a zone in which at least a portion of the magnetic member is always present for producing a second output signal which varies in direct response to changes in the magnetic and electrical properties of the member, said temperature monitoring means being constituted by said one coil inductively coupled with said primary winding wherein said one coil comprises an annular layer-wound coil surrounding the magnetic member and being located adjacent to said primary coil at said one end of said stack, the second output signal constituting a voltage induced across said one coil by the current in said primary winding; and calibrating means connected to said sensing means and said monitoring means for receiving the first and second output signals, said calibrating means containing predetermined calibrating information for producing a third output signal, in dependence of the first and second output signals, which represents the position of the member compensated for changes in temperature of the member.

4. A system according to claim 3, wherein said calibrating means comprises storage means which stores a table of temperature compensated positions corresponding to respective different pairs of first and second output signals.

5. A method for detecting the location of an elongated, magnetic member which is linearly movable between first and second positions along an axis corresponding to its longitudinal dimension by use of a position indication system having a sensing means operatively associated with the member for producing a first output signal which corresponds to the position of the member and which fluctuates with changes in the temperature of the member, wherein the member has magnetic and electrical properties which vary as a function of the temperature of the member, comprising the steps of:

measuring the temperature of the member with the use of electrical coils inductively coupled together, one of the coils being disposed adjacent a zone in which at least a portion of the member is always present and producing a second output signal which varies in direct response to changes in the magnetic and electrical properties of the member;

providing a calibrating means containing predetermined calibrating information for producing a third output signal, in dependence of the first and second output signals, which represents the position of the member compensated for changes in temperature of the member; and feeding the first and second output signals to the calibration means to produce the third output signal.

6. A method according to claim 5, wherein said member is the drive rod for a control rod of a nuclear reactor.

7. A position indication system for detecting the position of an elongaated magnetic member which is linearly movable between first and second positions along an axis corresponding to its longitudinal dimension, wherein the member has magnetic and electrical properties which vary as a function of the temperature of the member, comprising:

sensing means operatively associated with the member for producing a first output signal which corresponds to the position of the member and which fluctuates with changes in the temperature of the member;

temperature monitoring means including electrical coils inductively coupled together, with one of said coils being adjacent a zone in which at least a portion of the magnetic member is always present for producing a second output signal which varies in direct response to changes in the magnetic and electrical properties of the member; and calibrating means connected to said sensing means and said monitoring means for receiving the first and second output signals, said calibrating means contining predetermined calibrating information for producing a third output signal, in dependence of the first and second output signals, which represents the position of the member compensated for changes in temperature of the member, said calibrating means comprising storage means which stores a table of temperature compensated positions corresponding to respective different pairs of first and second output signals.

8. A method for detecting the location of an elongated magnetic member which is linearly movable between first and second positions along an axis corresponding to its longitudinal dimension by use of a position indication system having a sensing means operatively associated with the member for producing a first output signal which corresponds to the position of the member and which fluctuates with changes in the temperature of the member, wherein the member has magnetic and electrical properties which vary as a function of the temperature of the member, comprising the steps of:

measuring the temperature of the member with the use of electrical coils inductively coupled together, one of the coils being disposed adjacent a zone in which at least a portion of the member is always present and producing a second output signal which varies in direct response to changes in the magnetic and electrical properties of the member;

providing a calibrating means containing predetermined calibrating information for producing a third output signal, in dependence of the first and second output signals, which represents the position of the member compensated for changes in temperature of the member, said calibrating means including a storage device which stores a table of temperature compensated positions corresponding to respective different pairs of said first and second output signals; and feeding the first and second output signals to the calibration means to produce the third output signal.

9. A method according to claim 8, wherein said member is the drive rod for a control rod of a nuclear reactor.

10. A position indication system for detecting the position of an elongated magnetic member having an end linearly movable between first and second spaced locations along a longitudinal axis, the magnetic and electrical properties of said magnetic member varying as a function of the temperature thereof, comprising:

a linear transformer extending along and coaxial with said longitudinal axis, said linear transformer including primary and secondary windings receiving said movable magnetic member, said primary winding being excited by a voltage source and said secondary winding having a voltage induced thereacross corresponding to the approximate axial position of the end of said magnetic member; and a tertiary winding surrounding said magnetic member at all positions thereof as it is moved between said first and second locations, said tertiary winding having a voltage induced thereacross which corresponds to the temperature of said magnetic member; and memory means coupled to said secondary and tertiary windings, said memory means having stored therein a tabulation of secondary winding voltages as a function of the true axial positions of the end of said magnetic member at a plurality of tempertures, the output of said memory means being the true axial position of the end of said magnetic member as obtained from the voltage across said secondary winding corresponding to the approximate axial position of the end of said magnetic member and the voltage across said tertiary winding corresponding to the temperature of said magnetic member.

* * * * *